United States Patent [19]
Ritter et al.

[11] Patent Number: 6,036,254
[45] Date of Patent: Mar. 14, 2000

[54] CONTROL DEVICE FOR A VEHICLE WITH TWO ROOFS

[75] Inventors: Bernhard Ritter, Pforzheim; Hans-Dieter Dahmen, Neuhausen, both of Germany

[73] Assignee: Dr. Ing, h.c.F. Porsche AG, Patentabteilung-ECS, Germany

[21] Appl. No.: 09/262,300

[22] Filed: Mar. 4, 1999

[30] Foreign Application Priority Data

Mar. 4, 1998 [DE] Germany .................. 198 09 064

[51] Int. Cl.⁷ ............................................. B60J 7/08
[52] U.S. Cl. ................ 296/103; 296/107.01; 296/121; 296/107.09
[58] Field of Search ................ 296/107.01, 103, 296/121, 107.09

[56] References Cited

U.S. PATENT DOCUMENTS 5,154,479  10/1992  Sautter ........................... 296/121
5,904,394  5/1999  Dilluvio et al. ................. 296/121
5,938,271  8/1999  Schuler et al. .................. 296/121

*Primary Examiner*—Gary C. Hoge
*Attorney, Agent, or Firm*—Evenson, McKeown, Edwards & Lenahan, P.L.L.C.

[57] ABSTRACT

A control device for a vehicle having two roofs; a first roof which is permanently attached to the vehicle, and a second roof which can be removed from the vehicle. In order for the control device to no longer operate the first roof when the second roof is mounted and connected to a locking mechanism which serves as a releasable connection of both roofs with a windshield frame of a vehicle, a transmitter is arranged such that it sends a signal if the locking mechanism is in the proper locked position. A second transmitter is provided which sends a signal when the first roof is open. As a result, the control device suppresses the operation of the first roof if signals from both transmitters are received simultaneously.

8 Claims, 2 Drawing Sheets

CONTROL DEVICE FOR A VEHICLE WITH TWO ROOFS

BACKGROUND AND SUMMARY OF THE INVENTION

This application claims the priority of German application No. 198 09 064.1, filed Mar. 4, 1998, the disclosure of which is expressly incorporated by reference herein.

The invention relates to a control device for a vehicle having two roofs; a first roof which is permanently attached to the vehicle and a second roof, which can be removed from the vehicle.

Such a combination of two roofs is, for example, present in a convertible vehicle having a folding top, in which the two roofs are complementary, i.e., without switching the roofs, a hardtop roof can be mounted. In such a vehicle, it is important to assure that the control device cannot operate the first roof when the second roof is mounted.

In view of the foregoing, it is an object of the invention to provide an arrangement which prevents actuation of the first roof when the second roof is mounted, while incurring limited structural costs.

This and other objects and advantages is achieved by the device according to the invention, by providing a transmitter which is attached to a locking mechanism which serves as a releasable connection with the windshield frame of the vehicle for both roofs, and sends a signal when the locking mechanism is in a locked position. In addition, a second transmitter which sends a signal when the first roof is open is provided. If both signals are present at the same time the control device suppresses the actuation of the first roof.

In any event, the two transmitters are already present in the vehicle, and are used by the control device to operate the first roof when the second roof has been removed from the vehicle. As a result, the invention can be realized without any additional structural cost.

In general, the invention is based on the idea of recognizing when the second roof is mounted on the vehicle, by creating a situation in which a non-plausible condition of the transmitters exists for the first roof: that is, the first roof cannot be completely open (although the second transmitter's signal indicates that this condition is present), and at the same time be connected by a locking mechanism with the frame of the windshield (the first transmitter's signal indicates that this condition is also present).

In this manner, the control device additionally controls the actuation devices, if both transmitters send a signal simultaneously. As a result, the type of control of additional actuation devices can be made to depend upon whether or not the second roof is mounted. Further operational installations are, for example, window lifters for the side windows of the vehicle. When the second roof is mounted, these side windows have a different functional range than when the first roof is down and the second, mounted roof is not present. Thus, in case of an open first roof, the rear side windows can no longer be closed and therefore remain in a completely lowered position, i.e., after they have been lowered completely during the opening of the first roof. Alternatively, it is possible to not allow the rear side windows to be raised above the height of the front side windows. A further alternative is to simultaneously operate the front and rear side windows when the first roof is down. However, when a mounted second roof is detected (for this condition the first roof is also completely open), all side windows, independently of each other, can be moved into any desired position.

An additional functional range which is controlled by the opening position, concerns the positional control of the side window; because there is no backstop for the upward movement of the side windows when the first roof is down, the terminus of the side windows must be determined during closing via a positional transmitter. In the case of the detected, mounted second roof, however, the side windows can be moved until they rest against the seal; the terminus of the side windows is determined during closing via a load recognition on the part of the window lifter.

Other objects, advantages and novel features of the present invention will become apparent from the following detailed description of the invention when considered in conjunction with the accompanying drawings.

DETAILED DESCRIPTION OF THE DRAWINGS

Figure 1:
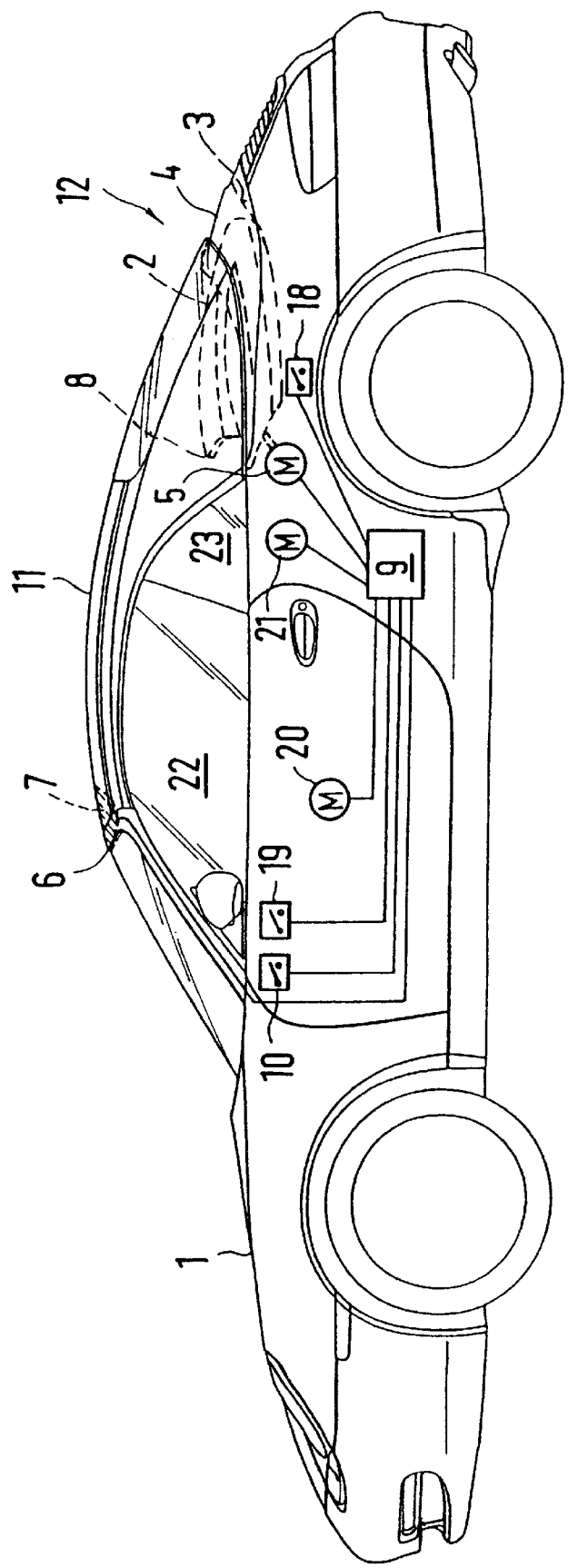
FIG. 1 is a side view of a vehicle with a completely open first roof and a mounted second roof.

A vehicle 1, which is a convertible, is provided with a first roof 2 which is a flexible folding roof and is permanently attached to the vehicle 1. When open, the first roof 2 is stored in a hood box 3 which is covered by the hood box cover 4. A drive mechanism 5 serves to drive the mechanism for opening and closing the first roof 2. The hood box cover 4 is connected to the drive mechanism 5 via a forced control, or alternatively it is equipped with its own drive mechanism (not shown). Nevertheless, the hood box cover 4 is controlled in a manner such that it is open during opening or closing of the first roof 2, and is closed otherwise.

On a windshield frame 6 of the vehicle 1, a locking mechanism 7 is provided which aids in the connection of a front end 8 of the first roof 2 (in the closed position of the first roof 2) to the windshield frame 6. The opening and closing of the first roof 2 is conducted with the help of a control device 9 which contains a corresponding operating sequence for the control. For initiating the opening and closing process of the first roof 2, a keying device 10 is provided in the interior space of the vehicle 1.

In the position shown in FIG. 1, the first roof 2 is completely down. (A disassembly of the first roof 2 is envisaged only when repair work becomes necessary.) In addition to the first roof 2, a second roof 11 is mounted on the vehicle 1 and connected with the latter via the locking mechanism 7 and further connecting elements (not shown) in the area of a foot 12. Because the foot 12 covers both the hood box cover 4 and the first roof 2 (when retracted), in this situation the operation of the first roof 2 by the drive mechanism 5 would lead to a collision between the first roof 2 or the hood box cover 4 and the second roof 11.

Figure 2:
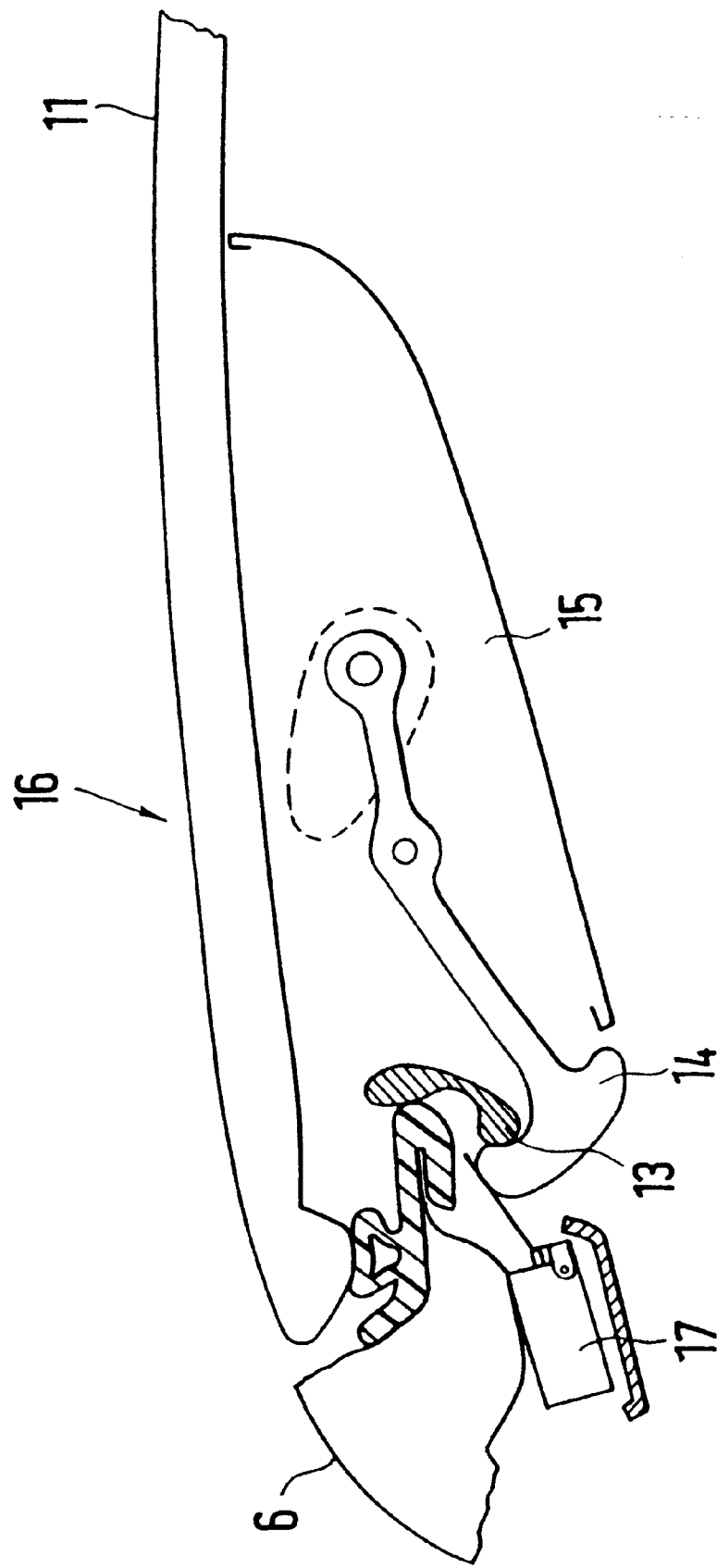
FIG. 2 is a cross-sectional view of a locking mechanism for connecting one of the roofs with the frame of the windshield of the vehicle.

FIG. 2 shows a cross-section of the locking mechanism 7, which consists of a catch receptacle 13 and a closing catch 14 that is a part of a first (electrically operated) locking mechanism 15. The latter is arranged on the front end 8 of the first roof 2, while a second locking mechanism 15 (mechanically operated) is arranged on the front end 16 of the second roof 11. At the catch receptacle 13, a first transmitter 17 (i.e., a micro-switch) is placed so that it sends a signal when the locking catch 14 has engaged the catch receptacle 13, and thus the locking mechanism 15 has created a connection between the windshield frame 6 and the second roof 11 or the first roof 2, respectively.

Additionally, as sketched in FIG. 1., a second transmitter 18, in the area of the hood box 3, sends a signal when the first roof 2 is in the depicted, completely open position. The second transmitter 18 can also be replaced by other possibilities for the recognition of the fully opened first roof 2, such as, for example, detecting the position of the hood box cover 4 and the position of the drive mechanism 5.

The signals of the transmitters 17 and 18 are sent to the control device 9, which deactivates any control of the control mechanism 5, as long as the signals of the transmitters 17 and 18 are present at the same time. Thus, the use of the keying device 10 has no effect in this situation.

Furthermore, a switch group 19, a second drive mechanism 20 and a third drive mechanism 21 are connected to the control device 9. The second drive mechanism controls the front side window 22, while the third drive mechanism 21 controls the rear side window. The control device 9 controls the drive mechanism 20, 21 according to requests via actuation of the switch group 19. On the opposite side of the vehicle 1, an additional switch group and additional drive mechanisms are provided for the side windows (not shown) on that side of the vehicle; the drive mechanisms of all side windows can be controlled by the switch group 19.

When the second roof 11 is mounted, the side windows 22, 23 can be lowered independently of each other. Moreover, for the front side window 22 comfort functions are available; in response to a brief push of one of the switches within the switch group 19 corresponding to the side window 22, the side window 22 is lowered completely (comfort-opening). In a similar manner, with a brief push of one of the switches corresponding to the side window 22, the latter can be automatically completely closed from any possible position (comfort-closing).

The previously mentioned functions, however, are available in their entirety only when and as long as the control device 9 recognizes, via the signals which it receives from the transmitter 17 and 18, that the second roof 11 is mounted. Otherwise, the functions comfort-opening and comfort-closing are not available, as in particular when the first roof 2 is down, an upper backstop for the closing of the side window 22 is missing. Further, the motion of the rear side window 23 is coupled with the motion of the front side window; for lowering the front side window 22, the rear side window 23 is lowered completely; this also applies when the front side window 22 is to be only partially lowered.

The previous description of the operation of the side windows 22 and 23 also applies analogously for the undepicted side windows on the opposite side of the vehicle 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Apparatus for a vehicle having an openable and closeable first roof which is permanently attached to the vehicle and a removable second roof, comprising:
   a locking mechanism for releasably connecting one of the first roof and second roof to a windshield frame;
   a first transmitter for sending a first signal when the locking mechanism has engaged one of the first roof and the second roof;
   a second transmitter for sending a second signal when the first roof is open; and
   a control device for receiving the first and second signals;
   wherein when the control device simultaneously receives the first and second signals, it suppresses operation of the first roof.

2. The apparatus according to claim 1, wherein the control device controls a plurality of operational devices, when the first and second signals from the first transmitter and second transmitter are received simultaneously.

3. The apparatus according to claim 2, wherein:
   the plurality of operational devices are window lifters; all side windows can be lowered, and other functions are available, when the first and second signals are simultaneously received from the first and second transmitters.

4. The apparatus according to claim 1, wherein the first roof is a flexible folding roof and the second roof is a hard top roof.

5. The apparatus according to claim 2, wherein the first roof is a flexible folding roof and the second roof is a hard top roof.

6. The apparatus according to claim 3, wherein the first roof is a flexible folding roof and the second roof is a hard top roof.

7. The apparatus according to claim 3, wherein the other functions are comfort-opening and comfort-closing functions.

8. The apparatus according to claim 3, wherein only a minimum of the side windows can be lowered and other functions are not available.

* * * * *